United States Patent
Mizia et al.

(10) Patent No.: US 12,523,372 B2
(45) Date of Patent: Jan. 13, 2026

(54) COMBUSTION SYSTEM FOR SOLID BIOMASS FUEL

(71) Applicant: COLORADO STATE UNIVERSITY RESEARCH FOUNDATION, Fort Collins, CO (US)

(72) Inventors: John Mizia, Fort Collins, CO (US); Maxwell Jerome Flagge, Loveland, CO (US); Jason Boyd Golly, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 822 days.

(21) Appl. No.: 17/797,954

(22) PCT Filed: Feb. 12, 2021

(86) PCT No.: PCT/US2021/017828
§ 371 (c)(1),
(2) Date: Aug. 5, 2022

(87) PCT Pub. No.: WO2021/163458
PCT Pub. Date: Aug. 19, 2021

(65) Prior Publication Data
US 2023/0065497 A1    Mar. 2, 2023

Related U.S. Application Data

(60) Provisional application No. 62/976,909, filed on Feb. 14, 2020.

(51) Int. Cl.
*F23G 5/00* (2006.01)
*C02F 11/06* (2006.01)
(Continued)

(52) U.S. Cl.
CPC .............. *F23G 5/002* (2013.01); *C02F 11/06* (2013.01); *F23H 1/02* (2013.01); *F23H 15/00* (2013.01);
(Continued)

(58) Field of Classification Search
CPC ................................. F23G 5/002; F23H 15/00
See application file for complete search history.

(56) References Cited

U.S. PATENT DOCUMENTS 1,722,495 A * 7/1929 Chapman ................ F23B 90/06
122/5
4,771,711 A 9/1988 Pike
(Continued)

FOREIGN PATENT DOCUMENTS

WO 2009126660 10/2009

OTHER PUBLICATIONS

International Search Report and Written Opinion, in connection with International Application No. PCT/US2021/017828, dated Apr. 12, 2021.

*Primary Examiner* — David J Laux
(74) *Attorney, Agent, or Firm* — Robinson IP Law, PLLC

(57) ABSTRACT

Various implementations include a combustor system including an inner wall, a fuel grate, an ash grinder, an igniter, and a fan. The inner wall defines a combustion chamber and has a longitudinal axis and first and second ends. The inner wall defines primary and secondary air inlets. The primary air inlets are defined closer than the secondary air inlets to the first end. The fuel grate is disposed within the combustion chamber between the primary and secondary air inlets and is configured to support fuel disposed within the combustion chamber. The ash grinder is disposed between the fuel grate and the secondary air inlets and is rotatable about the longitudinal axis relative to the
(Continued)

fuel grate. The igniter provides energy to the combustion chamber. The fan is configured to cause air to flow from the primary and secondary air inlets through the second end of the combustion chamber.

17 Claims, 4 Drawing Sheets

(51) Int. Cl.
    *C02F 103/00*     (2006.01)
    *F23G 5/04*     (2006.01)
    *F23H 1/02*     (2006.01)
    *F23H 15/00*     (2006.01)
    *F23Q 7/04*     (2006.01)

(52) U.S. Cl.
    CPC .......... *F23Q 7/04* (2013.01); *C02F 2103/005* (2013.01); *F23G 5/04* (2013.01); *F23G 2202/101* (2013.01); *F23G 2202/102* (2013.01); *F23G 2205/121* (2013.01); *F23G 2205/122* (2013.01); *F23G 2205/14* (2013.01); *F23G 2209/26* (2013.01)

(56) References Cited

U.S. PATENT DOCUMENTS

| | | |
|---|---|---|
| 5,381,741 A | 1/1995 | Ostile |
| 2002/0192608 A1 | 12/2002 | Flament et al. |
| 2011/0065815 A1 | 3/2011 | Sakai et al. |
| 2020/0208836 A1* | 7/2020 | Yu ........................ F23G 5/444 |

* cited by examiner

COMBUSTION SYSTEM FOR SOLID BIOMASS FUEL

CROSS-REFERENCE TO RELATED APPLICATIONS

This application is a national stage application filed under 35 U.S.C. § 371 of PCT/US2021/017828 filed Feb. 12, 2021, which claims the benefit of U.S. Provisional Patent Application No. 62/976,909, filed Feb. 14, 2020, the contents of which are incorporated herein by reference in their entirety.

BACKGROUND

The lack of any modern sanitation systems in many developing countries has led to the widespread prevalence of fecal contamination of food and water sources. Poor sanitation even contributes to about 700,000 child deaths from diarrhea each year.

Furthermore, military forward operations bases in locations without modern sanitation systems are often left with hiring local contractors to move waste off base. This means multiple non-military personnel have access to the vulnerable area of the base daily.

Thus, a need exists for a clean and efficient method for disposing of fecal matter.

SUMMARY

Various implementations include a combustor system. The system includes an inner wall, a fuel grate, an ash grinder, an igniter, and a fan. The inner wall defines a combustion chamber. The inner wall has a longitudinal axis, a first end, and a second end opposite and spaced apart from the first end along the longitudinal axis. The inner wall defines one or more primary air inlets and one or more secondary air inlets spaced apart from the one or more primary air inlets along the longitudinal axis. The one or more primary air inlets are defined closer than the one or more secondary air inlets to the first end of the inner wall. The fuel grate is disposed within the combustion chamber between the one or more primary air inlets and the one or more secondary air inlets. The fuel grate is configured to support fuel disposed within the combustion chamber. The fuel grate defines one or more grate openings. The ash grinder is disposed within the combustion chamber between the fuel grate and the one or more secondary air inlets. The ash grinder has at least one radially extending protrusion. The ash grinder is rotatable about the longitudinal axis relative to the fuel grate. The igniter is for providing energy to a portion of the combustion chamber between the fuel grate and the one or more secondary air inlets. The fan is configured to cause air to flow through the one or more primary air inlets and the one or more secondary air inlets, into the combustion chamber, and through the second end of the combustion chamber.

In some implementations, the system further includes an ash grinder motor coupled to the ash grinder for causing the rotate about the longitudinal axis relative to the fuel grate.

In some implementations, the system further includes an ash cup removably coupled to the first end of the inner wall.

In some implementations, the fan includes a variable speed fan.

In some implementations, the system further includes a processor in electrical communication with a system memory. The processor executes computer-readable instructions stored on the system memory to control the fan and the ignitor.

In some implementations, the system further includes a pressure senser. The processor is in electrical communication with the pressure sensor. The computer-readable instructions cause the processor to receive pressure data from the pressure sensor. The pressure data corresponds to the pressure differential between the combustion chamber and the ambient air pressure. The computer-readable instructions further cause the processor to determine whether the pressure of the combustion chamber is within an expected pressure range based on the pressure data. The expected pressure range is predetermined to cause enough air to flow through the one or more primary air inlets and one or more secondary air inlets into the combustion chamber to sustain combustion of fuel within the combustion chamber. The computer-readable instructions further cause the processor to cause the fan to either increase the pressure within the combustion chamber in response to the pressure differential being below the expected pressure range or decrease the pressure within the combustion chamber in response to the pressure differential being above the expected pressure range. In some implementations, the fuel includes feces containing 35 percent or less water by mass.

In some implementations, the system further includes a temperature sensor disposed between the second end of the inner wall and the one or more secondary air inlets. During an ignition phase, the computer-readable instructions cause the processor to receive temperature data from the temperature sensor. The temperature data corresponds to the temperature of the combustion chamber between the second end of the inner wall and the one or more secondary air inlets. The computer-readable instructions further cause the processor to determine whether the temperature of the combustion chamber is above an expected ignition temperature based on the temperature data. The expected ignition temperature is predetermined to indicate ignition of gases within the combustion chamber. The computer-readable instructions further cause the processor to cause the igniter to provide energy to the combustion chamber in response to the temperature of the combustion chamber being below the expected ignition temperature.

In some implementations, the igniter includes an air igniter. In some implementations, the system further includes at least one actuator and at least one valve configured to vary the air flow through the one or more primary air inlets, the one or more secondary air inlets, and the air igniter.

In some implementations, during an ignition phase, the processor causes the at least one actuator to periodically alternate between allowing air to flow through the one or more primary air inlets and the one or more secondary air inlets and allowing air to flow through the air igniter.

In some implementations, the system further includes an outer wall disposed radially outwardly from the inner wall. The outer wall and the inner wall define an annular outer chamber. The outer wall defines an air inlet manifold opening in communication with the outer chamber and the one or more primary air inlets and the one or more secondary air inlets. In some implementations, the system further includes at least one valve and at least one actuator configured to move the at least one valve to vary the air flow through the ignitor and the air inlet manifold opening. In some implementations, the system further includes at least a first valve and a second valve, and at least a first actuator and a second actuator. The first actuator is configured to move the first valve to vary the air flow through the ignitor and the second actuator is configured to move the second valve to vary the air flow through the air inlet manifold opening.

In some implementations, the system further includes at least a first valve and a second valve, and at least a first actuator and a second actuator. The first actuator is configured to move the first valve to vary the air flow through the one or more primary inlets and the second actuator is configured to move the second valve to vary the air flow through the one or more secondary air inlets.

In some implementations, a ratio of total area of the one or more secondary air inlets to the total area of the one or more primary inlets is from 2:1 to 6:1. In some implementations, the ratio of total area of one or more secondary air inlets to the total area of one or more primary inlets is 3:1.

In some implementations, the system further includes an auger and a hopper. The auger is rotatable to cause fuel to move from within the hopper into the combustion chamber. In some implementations, the auger is configured to rotate at a constant rotation speed.

In some implementations, the system further includes a toilet.

BRIEF DESCRIPTION OF DRAWINGS

Example features and implementations are disclosed in the accompanying drawings. However, the present disclosure is not limited to the precise arrangements and instrumentalities shown.

DETAILED DESCRIPTION

The devices, systems, and methods disclosed herein provide for a combustor system used to burn biomass fuel through gasification. The biomass fuel can be fecal matter, urine, food waste, or any combination thereof. The combustor system is configured to be located downstream from a toilet, outhouse, or cathole. Furthermore, the combustor systems use the minimum amount of components to limit the required electricity. The combustor system is powered by a solar panel such that it is transportable and is not reliant on an external power supply.

Various implementations include a combustor system. The system includes an inner wall, a fuel grate, an ash grinder, an igniter, and a fan. The inner wall defines a combustion chamber. The inner wall has a longitudinal axis, a first end, and a second end opposite and spaced apart from the first end along the longitudinal axis. The inner wall defines one or more primary air inlets and one or more secondary air inlets spaced apart from the one or more primary air inlets along the longitudinal axis. The one or more primary air inlets are defined closer than the one or more secondary air inlets to the first end of the inner wall. The fuel grate is disposed within the combustion chamber between the one or more primary air inlets and the one or more secondary air inlets. The fuel grate is configured to support fuel disposed within the combustion chamber. The fuel grate defines one or more grate openings. The ash grinder is disposed within the combustion chamber between the fuel grate and the one or more secondary air inlets. The ash grinder has at least one radially extending protrusion. The ash grinder is rotatable about the longitudinal axis relative to the fuel grate. The igniter is for providing energy to a portion of the combustion chamber between the fuel grate and the one or more secondary air inlets. The fan is configured to cause air to flow through the one or more primary air inlets and the one or more secondary air inlets, into the combustion chamber, and through the second end of the combustion chamber.

Figure 1:
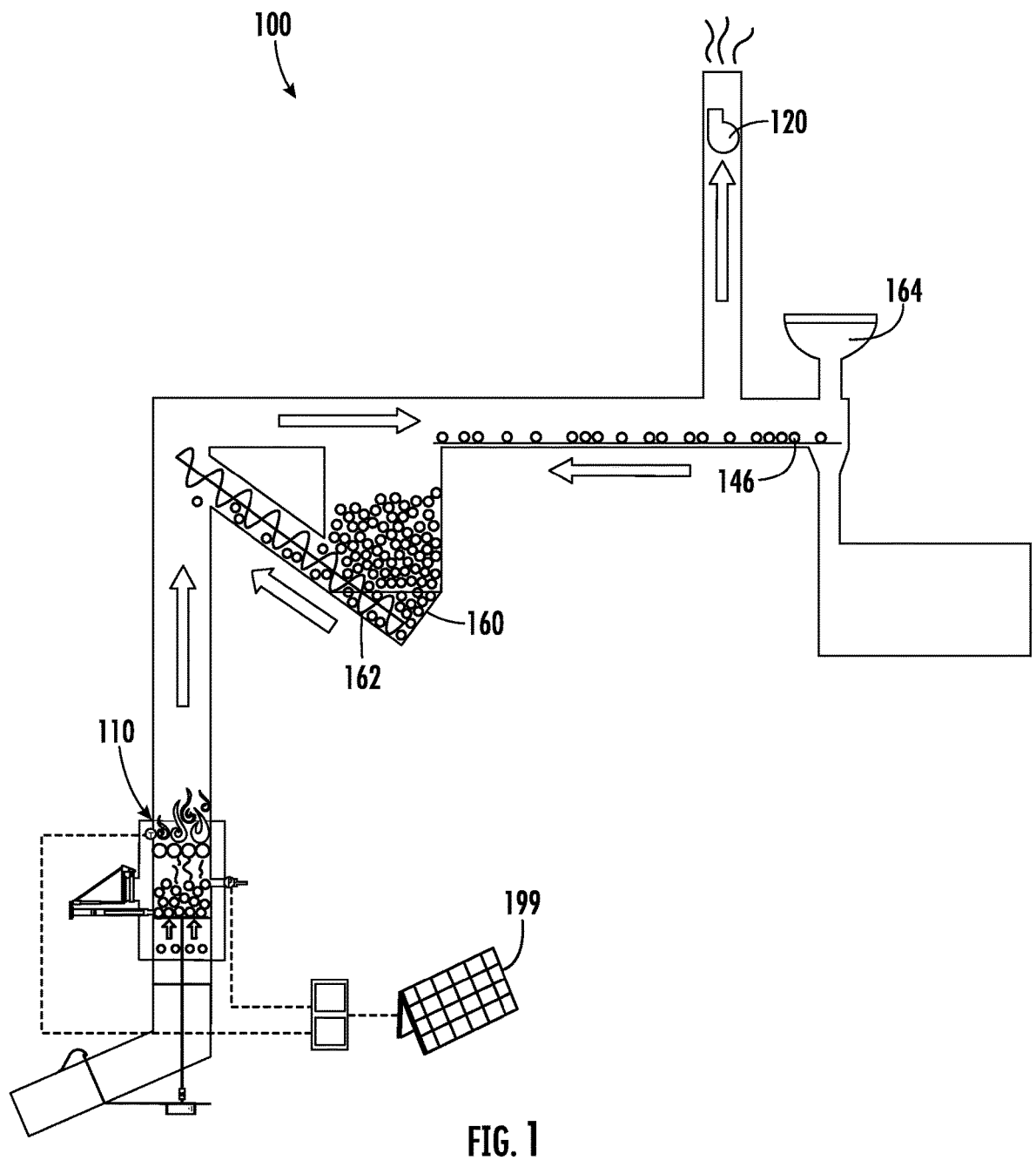
FIG. 1 is a cross-sectional view of a combustor system, according to one implementation.
Figure 2:
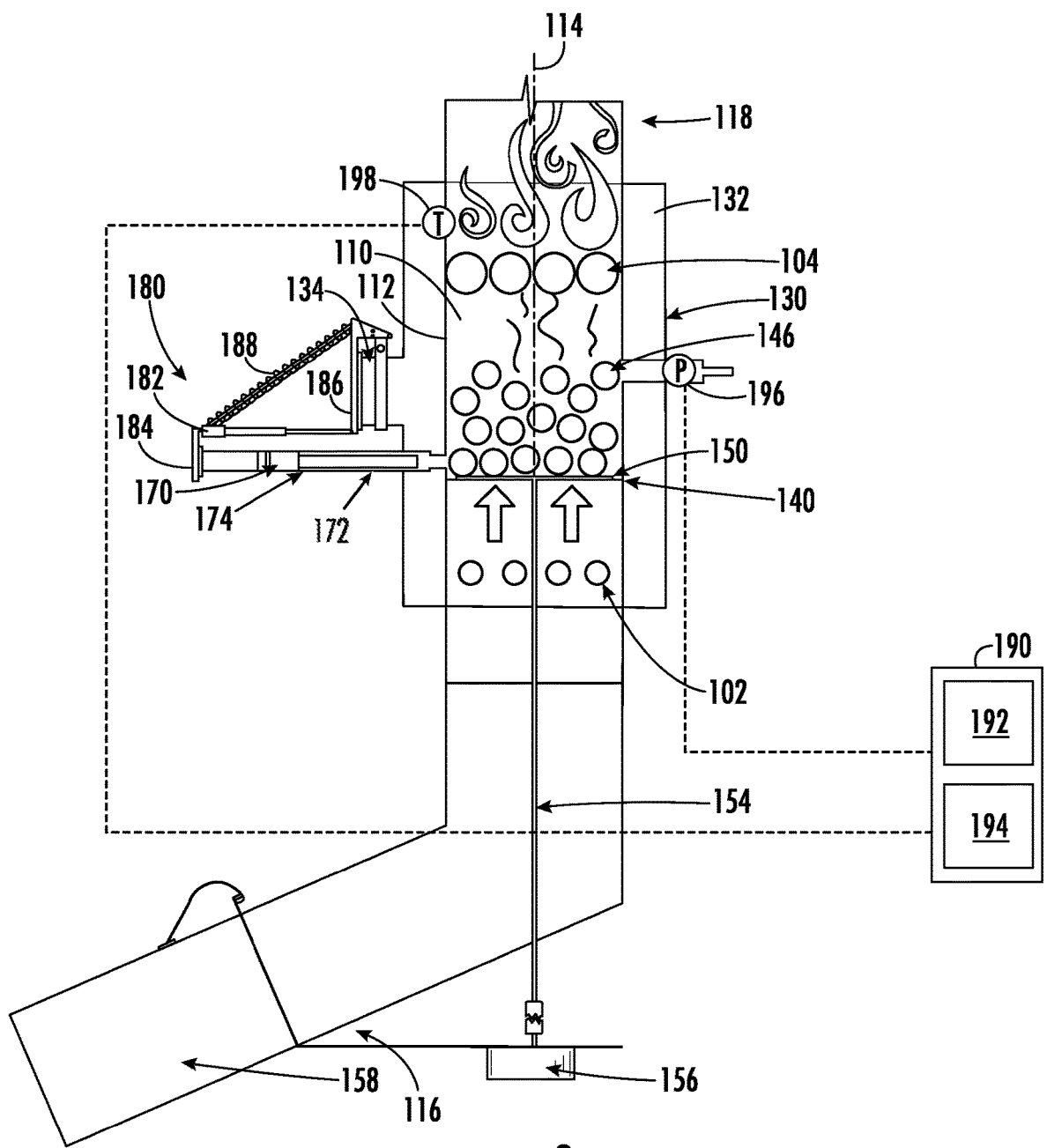
FIG. 2 is a cross-sectional view of a combustion chamber of the combustor system of FIG. 1.

FIG. 1 illustrates a cross section of a combustor system 100 that includes an inner wall 112, a fan 120, an outer wall 130, a fuel grate 140, an ash grinder 150, an ash cup 158, a hopper 160, an auger 162, a toilet 164, an igniter 170, a closure device 180, and a controller 190. FIG. 2 illustrates a cross-sectional detail view of the combustor system 100 of FIG. 1.

The inner wall 112 of the combustor system 100 has a longitudinal axis 114, a first end 116, and a second end 118 opposite and spaced apart from the first end 116 along the longitudinal axis 114. The inner wall 112 defines a cylindrical combustion chamber 110, eight primary air inlets 102, and eight secondary air inlets 104.

As shown in FIG. 2, the primary air inlets 102 are spaced apart from the secondary air inlets 104 along the longitudinal axis 114 such that the primary air inlets 102 are defined closer than the secondary air inlets 104 to the first end 116 of the inner wall 112. The ratio of total area of the secondary air inlets 104 to the total area of the primary air inlets 102 is 3:1. In other implementations, the ratio of the total area of the one or more secondary air inlets to the total area of the one or more primary inlets ranges from 2:1 to 6:1.

Although the primary air inlets 102 and secondary air inlets 104 are circular in FIGS. 1 and 2, in other implementations, the primary air inlets and secondary air inlets are triangular, square, rectangular, or any closed shape. Furthermore, in other implementations, the primary air inlets and secondary air inlets are different shapes. In some implementations, the inner wall of the combustor system defines any number of primary air inlets and any number of secondary air inlets such that the ratio of the total area of the one or more secondary air inlets to the total area of the one or more primary inlets ranges from 2:1 to 6:1. Although the inner wall 112 of the combustor system 100 defines the same number of primary air inlets 102 and secondary air inlets 104 in FIGS. 1 and 2, in other implementations, the inner wall defines a different number of primary air inlets than secondary air inlets. Although the inner wall 112 defines only a single row of eight primary air inlets 102, and a single row of eight secondary air inlets 104, in other implementations, the inner wall defines two or more axially spaced rows of primary air inlets and two or more axially spaced rows of eight secondary air inlets.

As shown in FIG. 1, the fan 120 is disposed downstream of the combustion chamber 110 and is configured to create a pressure differential. The pressure differential created by the fan 120 causes air to flow through the primary air inlets 102 and the secondary air inlets 104, into the combustion chamber 110, and through the second end 118 of the inner wall 112 of the combustor system 100. In the combustor system 100 illustrated in FIG. 1, the fan 120 includes a variable speed fan, but in other implementations, the fan may be a multispeed fan or a constant speed fan and can include guide vanes or dampers to alter the pressure differential across the fan.

Figure 3:
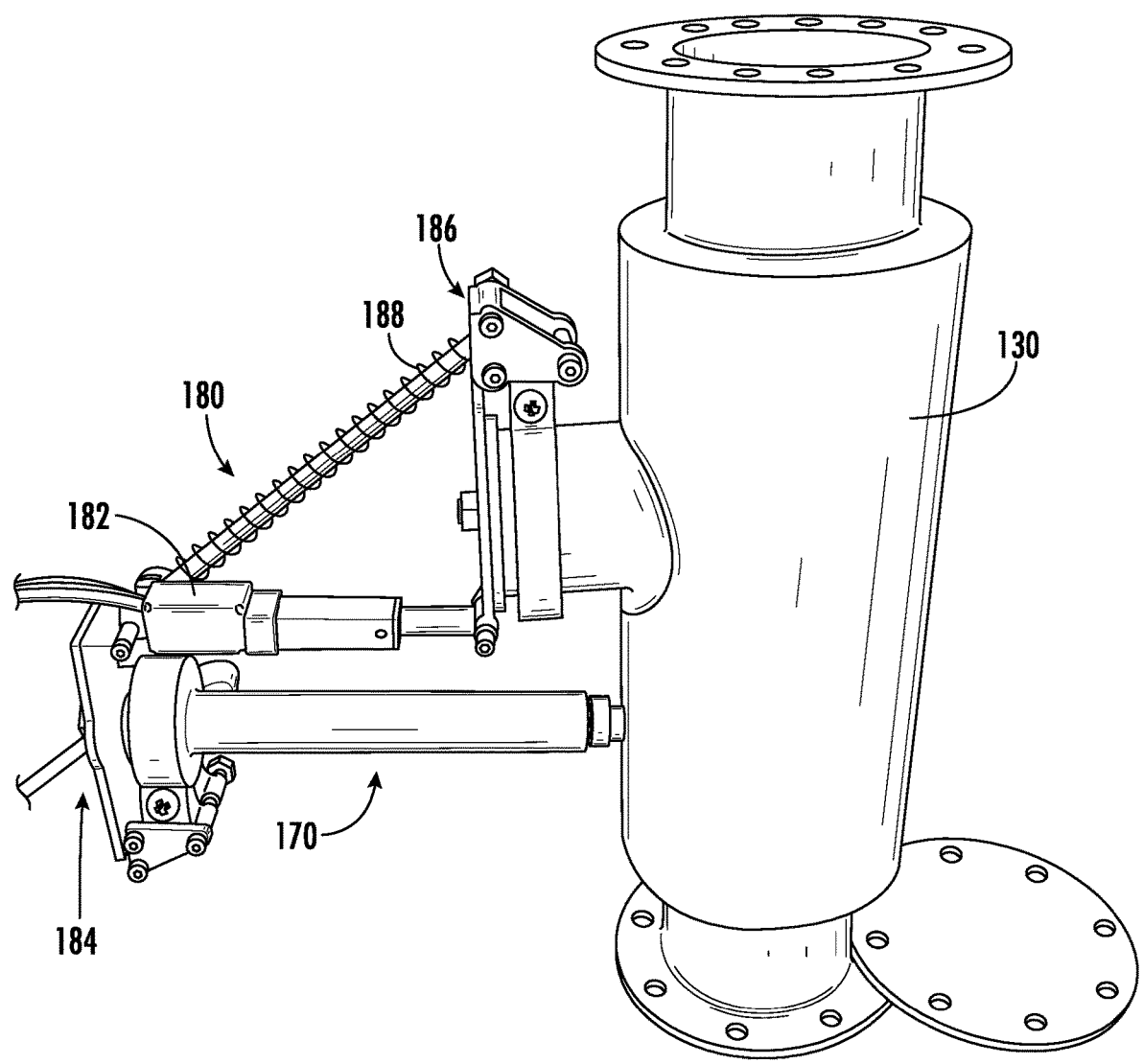
FIG. 3 is a perspective view of the combustion chamber of FIG. 1.

The outer wall 130 shown in FIG. 3 is disposed radially outwardly from the inner wall 112 such that the outer wall 130 and the inner wall 112 define an annular outer chamber 132. The outer wall 130 defines an air inlet manifold opening 134 that extends through the outer wall 130 to the annular outer chamber 132.

The air inlet manifold opening 134 is in fluid communication with ambient air external to the combustor system 100 and the outer chamber 132. The outer chamber 132 is in fluid communication with primary air inlets 102 and secondary air inlets 104. The fan 120 causes ambient air to flow through the air inlet manifold 134, through the outer chamber 132, through the primary air inlets 102 and secondary air inlets 104, and into the combustion chamber 110. Because the outer chamber 132 is in fluid communication with the primary air inlets 102 and the secondary air inlets 104, the air entering the primary air inlets 102 and the secondary air inlets 104 is at the same pressure.

Figure 4:
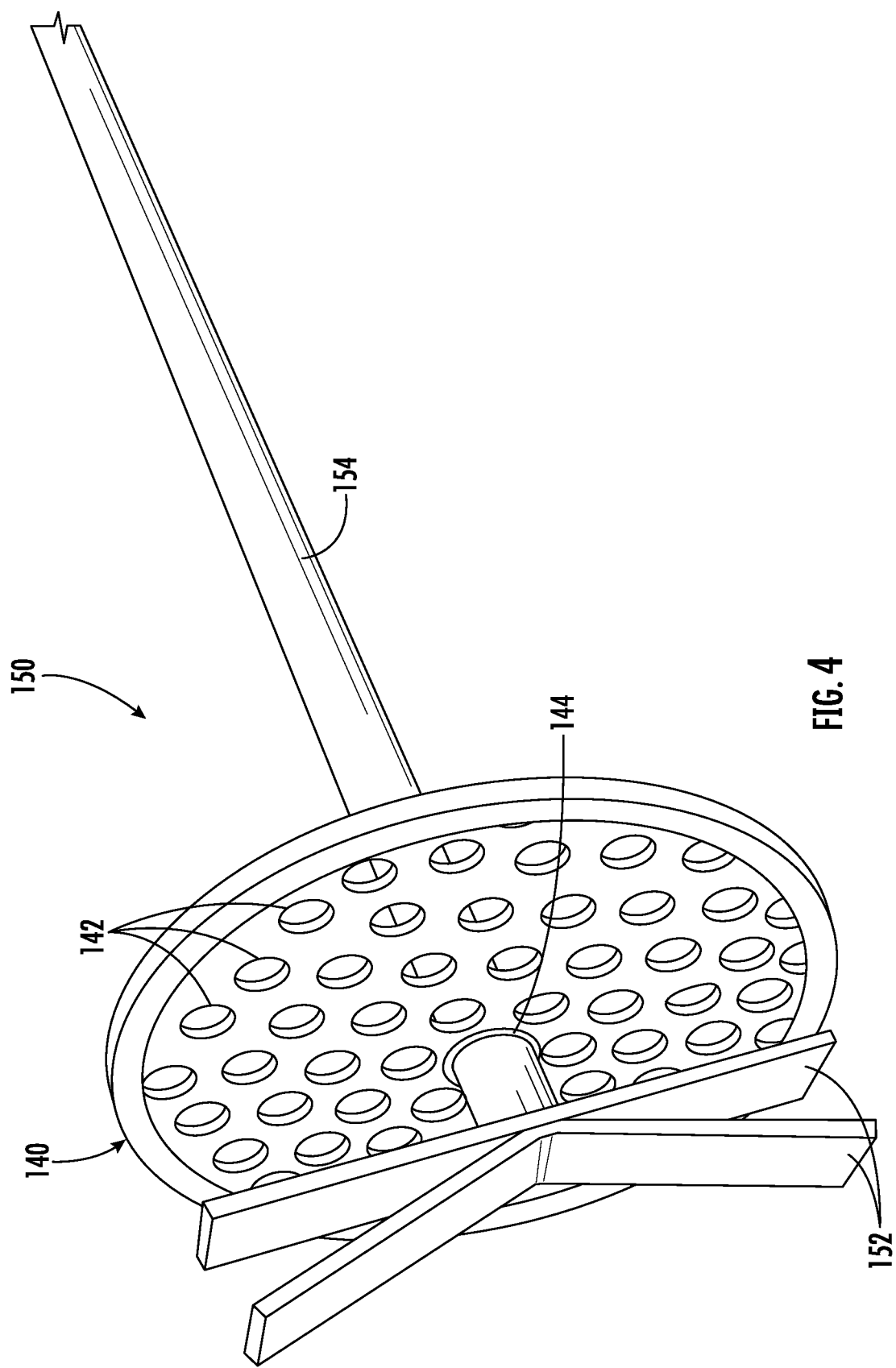
FIG. 4 is a perspective view of the ash grinder and fuel grate of the combustor system of FIG. 1.

As shown in FIGS. 2 and 4, the fuel grate 140 is a circular disk that defines multiple grate openings 142 and one central opening 144. The fuel grate 140 is disposed within the combustion chamber 110 between the primary air inlets 102 and the secondary air inlets 104. The fuel grate 140 is configured to support the unburnt fuel 146 disposed within the combustion chamber 110. The fuel 146 includes feces containing 35% or less water by mass, or any other organic fuel. In other implementations, the fuel includes feces containing 50% or less water by mass in addition to a dry fuel (10% moisture content wood/feces/other solid biomass). The grate openings 142 are sized and spaced to allow ash from burnt fuel to fall through the grate openings 142 but prevent unburnt fuel 146 from falling through the grate openings 142. The fuel grate 140 shown in FIG. 4 includes stainless steel, but in other implementations, the fuel grate includes any corrosion resistant steel, aluminum, or any other corrosion resistant material that can withstand the increased temperatures created by the combustion of fuel and/or pyrolysis gases.

The ash grinder 150, as shown in FIG. 4, includes a first and a second radially extending protrusion 152. The first and second radially extending protrusions 152 are fixably coupled to an ash grinder shaft 154. The ash grinder 150 is disposed within the combustion chamber 110 between the fuel grate 140 and secondary air inlets 104, and the ash grinder shaft 154 extends through the central opening 144 of the fuel grate 140.

Both radially extending protrusions 152 extend radially away from the ash grinder shaft 154 and are fixedly attached to each other. The first radially extending protrusion 152 is angled relative to the fuel grate 140 such that both ends of the first radially extending protrusion 152 form a ten degree angle relative to the fuel grate 140.

In other implementations, the ash grinder includes one, two, three, or any number of radially extending protrusions. In other implementations, both ends, one end of either one of the radially extending protrusions, or both of the radially extending protrusions are at the same or different angles between zero degrees and ninety degrees relative to the fuel grate.

The ash grinder 150 and ash grinder shaft 154 are coupled to an ash grinder motor 156. The diameter of the ash grinder shaft 154 is slightly smaller than the diameter of the central opening 144 of the fuel grate 140 to allow the ash grinder 150 and ash grinder shaft 154 to rotate about the longitudinal axis 114 relative to the fuel grate 140 when actuated by the ash grinder motor 156. The ash grinder 150 is configured such that, as the ash grinder 150 rotates, the protrusions 152 cause any ash produced by burning fuel to break apart and fall through the grate openings 142 of the fuel grate 140 and into the ash cup 158.

The ash cup 158 is a hollow cylinder with an open end and a closed end. The open end of the ash cup 158 is removably latched to the first end 116 of the inner wall 112 of the combustor system 100 such that the ash cup 158 collects the disintegrated ash that falls through the grate openings 142 of the fuel grate 140.

Although the ash cup 158 in FIG. 1 is a hollow cylinder, in other implementations, the ash cup is a hollow rectangular prism, a hollow cube, a hollow sphere, or any other hollow three-dimensional shape capable of collecting a solid. While the ash cup 158 is removably latched to the first end 116 of the inner wall 112 of the combustor system 100 in FIG. 1, in other implementations, the ash cup is removably coupled with an interference fit, fasteners, or any other form of removable coupling capable of holding the ash cup on the inner wall of the combustor system.

The fuel 146 is moved from the hopper 160 to the fuel grate 140 by the auger 162 as shown in FIG. 1. Also shown in FIG. 1, the toilet 164 is in communication with the hopper 160 and a fuel drying system to dehydrate and introduce feces into the system. The dried feces can then be stored in the hopper 160 until it is used as fuel 146 in the combustor system 100. A portion of the auger 162 is disposed within the hopper 160 and is rotatable at a constant speed to cause fuel 146 to move from within the hopper 160 into the combustion chamber 110. In other implementations, the auger is rotatable at a non-constant speed.

The igniter 170 includes a heating element 172 and an igniter sheath 174. At least a portion of the igniter 170 is disposed adjacent the combustion chamber 110. The igniter 170 is configured to provide energy to a portion of the combustion chamber 110 between the fuel grate 140 and the secondary air inlets 104. The igniter sheath 174 is a hollow tube and is in fluid communication with the air outside the combustor system 100 and the combustion chamber 110 such that air can flow through the ignitor sheath 174, past the heating element 172, and into the combustion chamber 110. The heating element 172 includes an electric resistance element embedded in a ceramic material. The heating element 172 is disposed within the ignitor sheath 174. When the heating element 172 is energized, air flowing through the ignitor sheath 174 is heated by the heating element 172. A 165 W igniter is able to light fuel including feces containing 35% or less water by mass within one to four minutes, which equates to between 5.5 and 11 watt-hours per ignition event.

The closure device 180 shown in FIG. 3 is configured to control the air flow through both the ignitor sheath 174 and the air inlet manifold opening 134. The closure device 180 includes an actuator 182, an ignitor sheath valve 184, an inlet manifold valve 186, and a spring 188. The ignitor sheath valve 184 is sealingly coupled to the ignitor sheath 174, and the inlet manifold valve 186 is sealingly coupled to the inlet manifold opening 134. The actuator 182 is movable between an extended position, a retracted position, and a middle position between the extended position and the retracted position. The actuator 182 is coupled to both the ignitor sheath valve 184 and the air inlet manifold valve 186 such that, in the extended position, the ignitor sheath valve 184 is open, and the inlet manifold valve 186 is closed. The spring 188 is a low stiffness compression spring and provides opening pressure to the ignitor sheath valve 184 and the inlet manifold valve 186 such that, when the actuator 182 is at the retracted position, ignitor sheath valve 184 is closed, and inlet manifold valve 186 is open. When the actuator 182 is moved to the middle position, the ignitor sheath valve 184 opens, and the inlet manifold valve 186 is also open. When the actuator 182 is at the extended position, inlet manifold valve 186 is closed.

In other implementations, the closure device further includes a spring coupled to the ignitor sheath valve and the ignitor sheath to bias the ignitor sheath valve in the open position.

In other implementations, the combustor system includes one or more actuators and one or more valves configured to vary the air flow through the one or more primary air inlets, the one or more secondary air inlets, and the air igniter.

For example, in other implementations, the combustor system includes a first valve and a second valve and at least a first actuator and a second actuator. The first actuator is configured to move the first valve to vary the air flow through the ignitor, and the second actuator is configured to move the second valve to vary the air flow through the air inlet manifold opening.

In other implementations, the combustor system includes at least a first valve, a second valve, and a third valve and at least a first actuator, a second actuator, and a third actuator. The first actuator is configured to move the first valve to vary the air flow through the ignitor, the second actuator is configured to move the second valve to vary the air flow through the one or more primary inlets, and the third actuator is configured to move the third valve to vary the air flow through the one or more secondary air inlets.

The controller 190 includes a processor 192 and a system memory 194. The processor 192 is in electrical communication with the system memory 194 and is configured to execute computer-readable instructions stored on the system memory 194 to control the combustor system 100. As shown in FIG. 1, the combustor system 100 also includes a solar panel 199 to supply power to the controller 190, air igniter 170, the fan 120, the ash grinder motor 156, the auger 162, and the actuator 182.

The combustor system 100 further includes a pressure sensor 196. The pressure sensor 196 is disposed in the combustion chamber 110 between the primary inlets 102 and secondary inlets 104 and is configured to measure the pressure differential between the ambient pressure external to the combustor system 100 and the pressure within the combustion chamber 110. The pressure sensor 196 is in electrical communication with the processor 192 to provide input data in the form of pressure data to the controller 190.

The processor 192 executes computer-readable instructions to receive pressure data from the pressure sensor 196 and to determine whether the pressure of the combustion chamber 110 is within an expected pressure range based on the pressure data. The expected pressure range is stored within the system memory 194 and is predetermined to ensure that enough air is flowing into the combustion chamber 110 to sustain combustion of fuel within the combustion chamber 110. If the pressure differential is below the expected pressure range, the processor 192 causes the fan 120 to increase the pressure differential across the fan 120 such that the flow rate of air through the combustion chamber 110 increases. If the pressure differential is above the expected pressure range, the processor 192 causes the fan 120 to decrease the pressure differential across the fan 120 such that the flow rate of air through the combustion chamber 110 decreases.

The combustor system 100 also includes a temperature sensor 198 disposed between the second end 118 of the inner wall 112 and the secondary air inlets 104. The temperature sensor 198 is in electrical communication with the processor 192 to provide input data to the controller 190. In use, the temperature sensor 198 measures temperature data that corresponds to the temperature of the combustion chamber 110 between the second end 118 of the inner wall 112 and the secondary air inlets 104.

During the ignition phase of the combustor system 100, the processor 192 executes the computer-readable instructions to receive temperature data from the temperature sensor 198 and to determine whether the temperature of the combustion chamber 110 is above an expected ignition temperature. The expected ignition temperature is stored within the system memory 194 and is predetermined to indicate ignition of pyrolysis gases created by the gasification of the fuel 146 within the combustion chamber 110, as discussed below. If the temperature of the combustion chamber 110 is below the expected ignition temperature, the processor 192 energizes the heating element 172 and actuates the closure device 180 to open the igniter sheath valve 174 such that the igniter 170 provides energy to the combustion chamber 110. During the ignition phase, the processor 192 causes the closure device 180 to periodically alternate between allowing air into the ignitor sheath 174 and into the air inlet manifold opening 134. Periodically alternating between allowing air into the igniter sheath 174 and into the air inlet manifold opening 134 causes the combustor system 100 to switch between introducing energy and oxygen to the fuel 146.

The combustor system 100 begins the ignition phase by heating air flowing through the igniter sheath 174 such that the heated air entering the combustion chamber 110 begins to heat the fuel 146. As discussed above, the processor 192 causes the actuator 182 to periodically alternate between the extended position and retracted position to alternate between heating the fuel 146 and providing air to the inlet manifold opening 134. Although enough heat is transferred from the air igniter 172 to the fuel 146 for ignition, the amount of air provided to the fuel 146 through the primary air inlets 102 is not enough to sustain combustion. Instead, as air enters the combustion chamber 110 from the primary air inlets 102 and contacts the hot fuel 146, the hot fuel 146 produces a pyrolysis gas. The pressure differential created by the fan 120 causes the pyrolysis gas produced by the fuel 146 to flow toward the secondary air inlets 104. As described above, the speed of the fan 120 is controlled based on the pressure differential between the combustion chamber 110 and ambient air external to the combustor system 100 (as sensed by the pressure sensor 196). As the pyrolysis gas meets the secondary air inlets 104, the additional air flowing through the secondary air inlets 104 mixes with the pyrolysis gas. Because the pyrolysis gas production has been initiated by the heating element 172, the additional air from the secondary air inlets 104 causes the pyrolysis gas flowing past the secondary air inlets 104 to ignite. Once the processor 192 determines that the expected ignition temperature has been reached (as sensed by the temperature sensor 198), the ignition phase ends, and steady-state burning is achieved. The processor 192 controls the fan 120 and actuator 182 and air inlet manifold valve 186 based on pressure sensor data to sustain the combustion of the fuel 146.

In some implementations, the combustor system further includes thermoelectric generators to convert excess heat into electricity. In other implementations, the biomass fuel includes urine, and the urine is electrochemically purified.

A number of example implementations are provided herein. However, it is understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A combustor system, the system comprising:
    an inner wall defining a combustion chamber, the inner wall having a longitudinal axis, a first end, and a second end opposite and spaced apart from the first end along the longitudinal axis, wherein the inner wall defines one or more primary air inlets and one or more secondary air inlets spaced apart from the one or more primary air inlets along the longitudinal axis, wherein the one or more primary air inlets are defined closer than the one or more secondary air inlets to the first end of the inner wall;
    a fuel grate disposed within the combustion chamber between the one or more primary air inlets and the one or more secondary air inlets, the fuel grate configured to support fuel disposed within the combustion chamber, wherein the fuel grate defines one or more grate openings;
    an ash grinder disposed within the combustion chamber between the fuel grate and the one or more secondary air inlets, the ash grinder having at least one radially extending protrusion, wherein the ash grinder is rotatable about the longitudinal axis relative to the fuel grate;
    an igniter for providing energy to a portion of the combustion chamber between the fuel grate and the one or more secondary air inlets;
    a fan configured to cause air to flow through the one or more primary air inlets and the one or more secondary air inlets, into the combustion chamber, and through the second end of the combustion chamber;
    a processor in electrical communication with a system memory, wherein the processor executes computer-readable instructions stored on the system memory to control the fan and the ignitor, wherein the igniter comprises an air igniter; and
    at least one actuator and at least one valve configured to vary the air flow through the one or more primary air inlets, the one or more secondary air inlets, and the air igniter, wherein during an ignition phase, the processor causes the at least one actuator to periodically alternate between allowing air to flow through the one or more primary air inlets and the one or more secondary air inlets and allowing air to flow through the air igniter.

2. The system of claim 1, further comprising an ash grinder motor coupled to the ash grinder for causing the rotate about the longitudinal axis relative to the fuel grate.

3. The system of claim 1, further comprising an ash cup removably coupled to the first end of the inner wall.

4. The system of claim 1, wherein the fan comprises a variable speed fan.

5. The system of claim 1, further comprising a pressure senser, wherein the processor is in electrical communication with the pressure sensor, wherein the computer-readable instructions cause the processor to:
    receive pressure data from the pressure sensor, wherein the pressure data corresponds to the pressure differential between the combustion chamber and the ambient air pressure,
    determine whether the pressure of the combustion chamber is within an expected pressure range based on the pressure data, wherein the expected pressure range is predetermined to cause enough air to flow through the one or more primary air inlets and one or more secondary air inlets into the combustion chamber to sustain combustion of fuel within the combustion chamber, and
    cause the fan to either:
        increase the pressure within the combustion chamber in response to the pressure differential being below the expected pressure range, or
        decrease the pressure within the combustion chamber in response to the pressure differential being above the expected pressure range.

6. The system of claim 5, wherein the fuel comprises feces containing 35 percent or less water by mass.

7. The system of claim 1, further comprising a temperature sensor disposed between the second end of the inner wall and the one or more secondary air inlets, wherein, during an ignition phase, the computer-readable instructions cause the processor to:
    receive temperature data from the temperature sensor, wherein the temperature data corresponds to the temperature of the combustion chamber between the second end of the inner wall and the one or more secondary air inlets,
    determine whether the temperature of the combustion chamber is above an expected ignition temperature based on the temperature data, wherein the expected ignition temperature is predetermined to indicate ignition of gases within the combustion chamber, and
    cause the igniter to provide energy to the combustion chamber in response to the temperature of the combustion chamber being below the expected ignition temperature.

8. The system of claim 1, wherein the igniter comprises an air igniter.

9. The system of claim 1, further comprising an outer wall disposed radially outwardly from the inner wall, wherein the outer wall and the inner wall define an annular outer chamber, wherein the outer wall defines an air inlet manifold opening in communication with the outer chamber and the one or more primary air inlets and the one or more secondary air inlets.

10. The system of claim 9, further comprising the at least one actuator configured to move the at least one valve to vary the air flow through the air inlet manifold opening.

11. The system of claim 9, further comprising at least a second valve, and at least a second actuator, wherein the first actuator is configured to move the first valve to vary the air flow through the ignitor and the second actuator is configured to move the second valve to vary the air flow through the air inlet manifold opening.

12. The system of claim 1, further comprising at least a second valve, and at least a second actuator, wherein the first actuator is configured to move the first valve to vary the air flow through the one or more primary inlets and the second actuator is configured to move the second valve to vary the air flow through the one or more secondary air inlets.

13. The system of claim 1, wherein a ratio of total area of the one or more secondary air inlets to the total area of the one or more primary inlets is from 2:1 to 6:1.

14. The system of claim 13, wherein the ratio of total area of one or more secondary air inlets to the total area of one or more primary inlets is 3:1.

15. The system of claim 1, further comprising an auger and a hopper, the auger being rotatable to cause fuel to move from within the hopper into the combustion chamber.

16. The system of claim 15, wherein the auger is configured to rotate at a constant rotation speed.

17. The system of claim 1, further comprising a toilet.

* * * * *